June 14, 1927.
G. P. WENNEMER
PROTECTIVE DEVICE
Filed Nov. 21, 1923
1,632,050
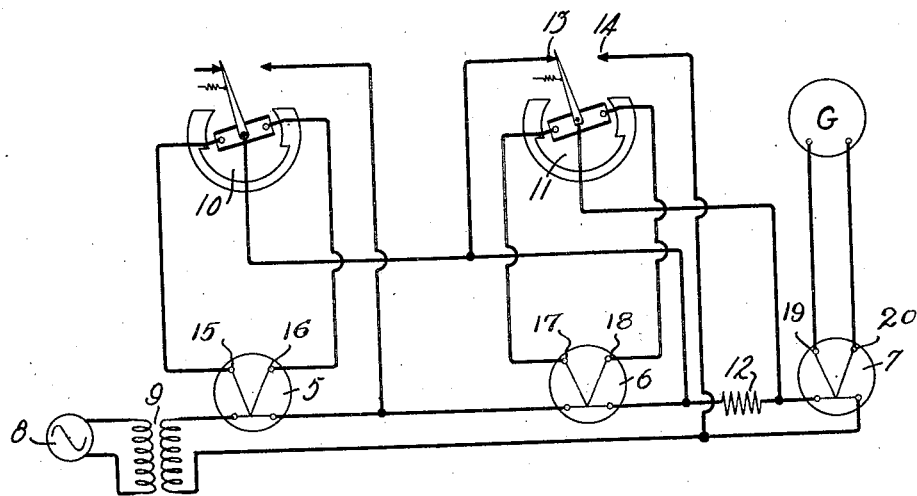
Inventor
Gerard P. Wennemer
by
Atty.

Patented June 14, 1927.

1,632,050

UNITED STATES PATENT OFFICE.

GERARD P. WENNEMER, OF NEW YORK, N. Y., ASSIGNOR TO WESTERN ELECTRIC COMPANY, INCORPORATED, OF NEW YORK, N. Y., A CORPORATION OF NEW YORK.

PROTECTIVE DEVICE.

Application filed November 21, 1923. Serial No. 676,131.

This invention relates to protective devices, and more particularly, to protective devices for use in connection with current measuring instruments.

The object of the invention is the efficient, sensitive and reliable protection of delicate electrical devices of the type generally used for the measurement of electric current of small value.

The invention consists in the provision of a relay operated by the voltage developed by a thermocouple having a heater element of low resistance in series with the heater element of the thermocouple to be protected. This relay in operating brings about a change in the circuit to effect the protection of the latter thermocouple. Preferably the operation of this relay, in addition to effecting a circuit change to protect the thermocouple, also replaces such thermocouple by an equivalent resistance.

The single figure of the drawing illustrates schematically a circuit including an embodiment of the invention.

In the drawing are shown three thermocouples 5, 6 and 7 which have their heater elements connected in series to a source of alternating current 8 through a transformer 9. The heater elements of the thermocouples 5, 6 and 7 are of different resistances, namely, 5, 40 and 600 ohms, respectively.

Connected to the terminals 15 and 16 of the thermocouple 5 is a very sensitive electromagnetic device 10 such as a volt meter relay adapted to short circuit the thermocouple 6. Likewise, connected to the terminals 17 and 18 of the thermocouple 6 is a volt meter relay 11 for short circuiting the thermocouple 7 and inserting in its place a normally shunted resistance 12, the magnitude of which corresponds to the resistance of the thermocouple 7. As illustrated a galvanometer is connected to the terminals 19 and 20 of the thermocouple 7 and serves for measuring the current passing through that thermocouple.

Some moderately sensitive electrical devices can well be protected by the use of fuses, but in the case of thermocouples having a heater element whose resistance approximates 600 ohms, it is impractical to provide a fuse for such devices. However, with the arrangement of this invention, fuses are not required for the heater element of thermocouple 5 which is designed to withstand currents from source 8 in the heater element of range of 60 to 100 milliamperes, the heater element of thermocouple 6 approximately 15 milliamperes and the thermocouple 7 will burn out on current values exceeding 5 milliamperes. Thus, by using the current derived from the thermocouples for operating sensitive electromagnetic devices, the thermocouples connected to the measuring instrument can be protected without the use of fuses which are very costly and in many cases cannot be obtained for the lower current ranges.

Assume, for the sake of illustration, that the current from source 8 through the heater element of thermocouple 7 is in the neighborhood of 5 milliamperes. So long as the current is 5 milliamperes or less, the relays 10 and 11 will not operate. However, should the current increase beyond 5 milliamperes the current in the heater element of thermocouple 6 will be such as to operate relay 11, opening contact 13 and closing contact 14. The opening of contact 13 and the closure of contact 14 short circuits the heater element of the thermocouple 7 and substitutes in its place the resistance 12, the magnitude of which as above stated corresponds to that of the heater element of the thermocouple 7. Now, should the current from source 8 through the feed line become such as to endanger the heater element of thermocouple 6, the current in the galvanometer side of the thermocouple 5 will cause the operation of relay 10 for short circuiting the heater element of thermocouple 6. Inasmuch as the heater element of thermocouple 5 will safely withstand currents between 60 and 100 milliamperes, no protective element need be provided as the likelihood of going beyond this current range is very remote. It should be noted that the relays 10 and 11 are each provided with a biasing spring which may be adjusted so that these relays will respond quickly to a current which might prove injurious to the heater elements of the thermocouple being protected.

Although the invention has been illustrated and described with reference to a particular circuit, it is, of course, obvious that various modifications may be made without departing from the spirit and scope of the present invention.

What is claimed is:

1. In combination, a thermocouple, a heater element therefor, a measuring instrument associated with said thermocouple, a second thermocouple, a heater element therefor connected in series with the heater element of the first mentioned thermocouple, and means associated with said second thermocouple and responsive to currents of a predetermined strength for reducing the flow of current through said first mentioned heater element.

2. In combination, a thermocouple, a heater element therefor, a measuring instrument associated with said thermocouple, a second thermocouple, a heater element therefor serially connected with the heater element of the first mentioned thermocouple, a resistance of a magnitude equal to the resistance of the heater element of said first thermocouple, and means responsive to the passage of a predetermined current through said second thermocouple for short circuiting said first heater element and substituting therefor said resistance.

3. In combination, a thermocouple, a heater element therefor, a measuring instrument associated with said thermocouple, a second thermocouple, a heater element therefor connected in series with the first mentioned heater element, and a relay responsive to the passage of currents of a predetermined strength through the heater element of said second thermocouple for stopping the flow of current through said first heater element.

4. In combination, a source of current, a pair of themocouples, heater elements therefor serially connected with said source of current, and means controlled by one of said thermocouples and responsive when the current through its heater element reaches a predetermined value for stopping the flow of current through said other heater element.

5. In combination, a plurality of heater elements therefor, of themocouples of different resistances, a current supply source therefor, a current measuring device connected to one of said thermocouples, and electromagnetic means associated with each of the other thermocouples operable when the current derived from their respective thermocouples is of a certain value for controlling the flow of current in the element associated with the measuring device.

In witness whereof, I hereunto subscribe my name this 19th day of November A. D., 1923.

GERARD P. WENNEMER.